Nov. 27, 1956 C. F. WALLACE 2,771,773
MEASUREMENT OF MASS RATE OF FLOW OF FLUENT MATERIAL
Filed May 10, 1952 2 Sheets-Sheet 1
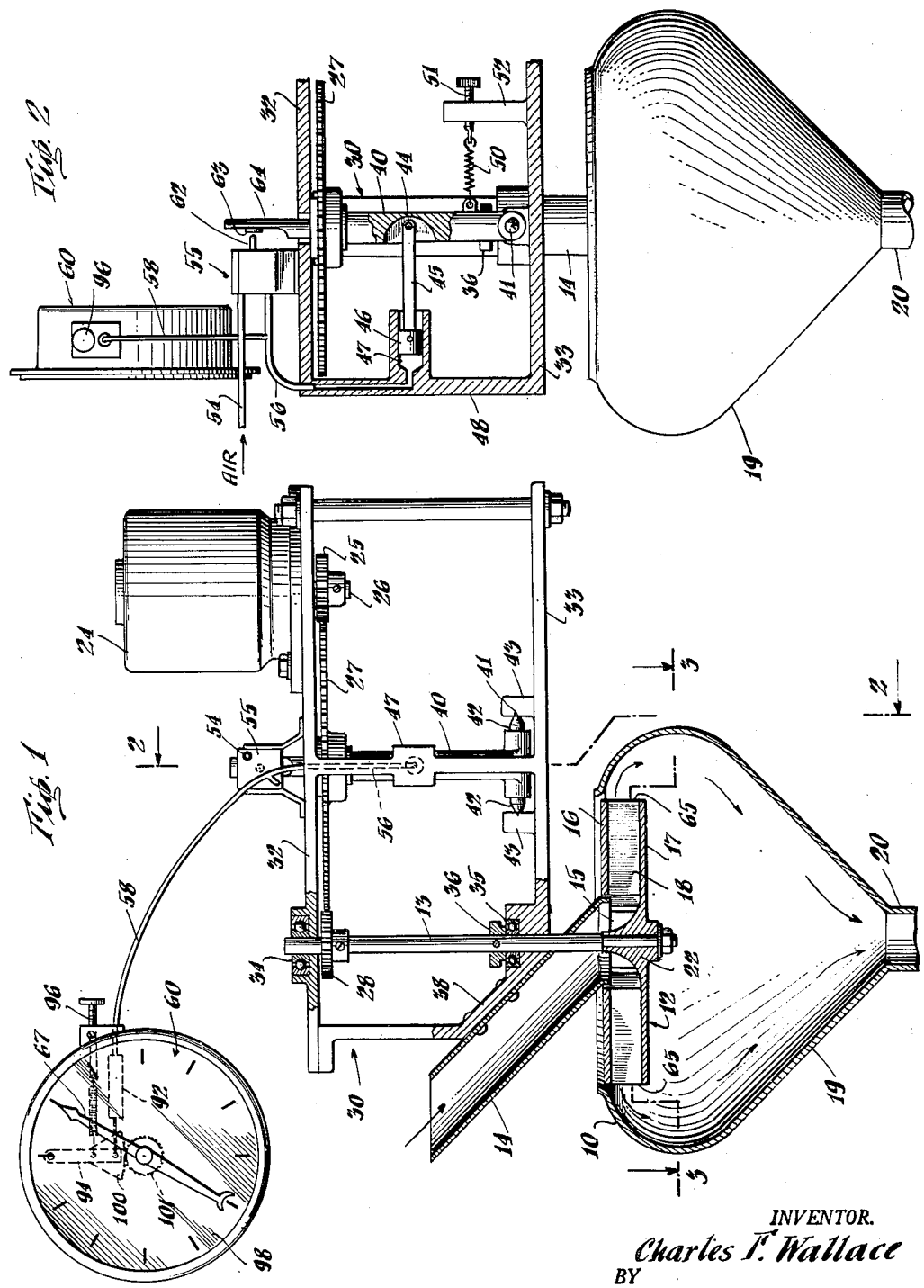
INVENTOR.
Charles F. Wallace
BY
Robert S. Dunham
ATTORNEY

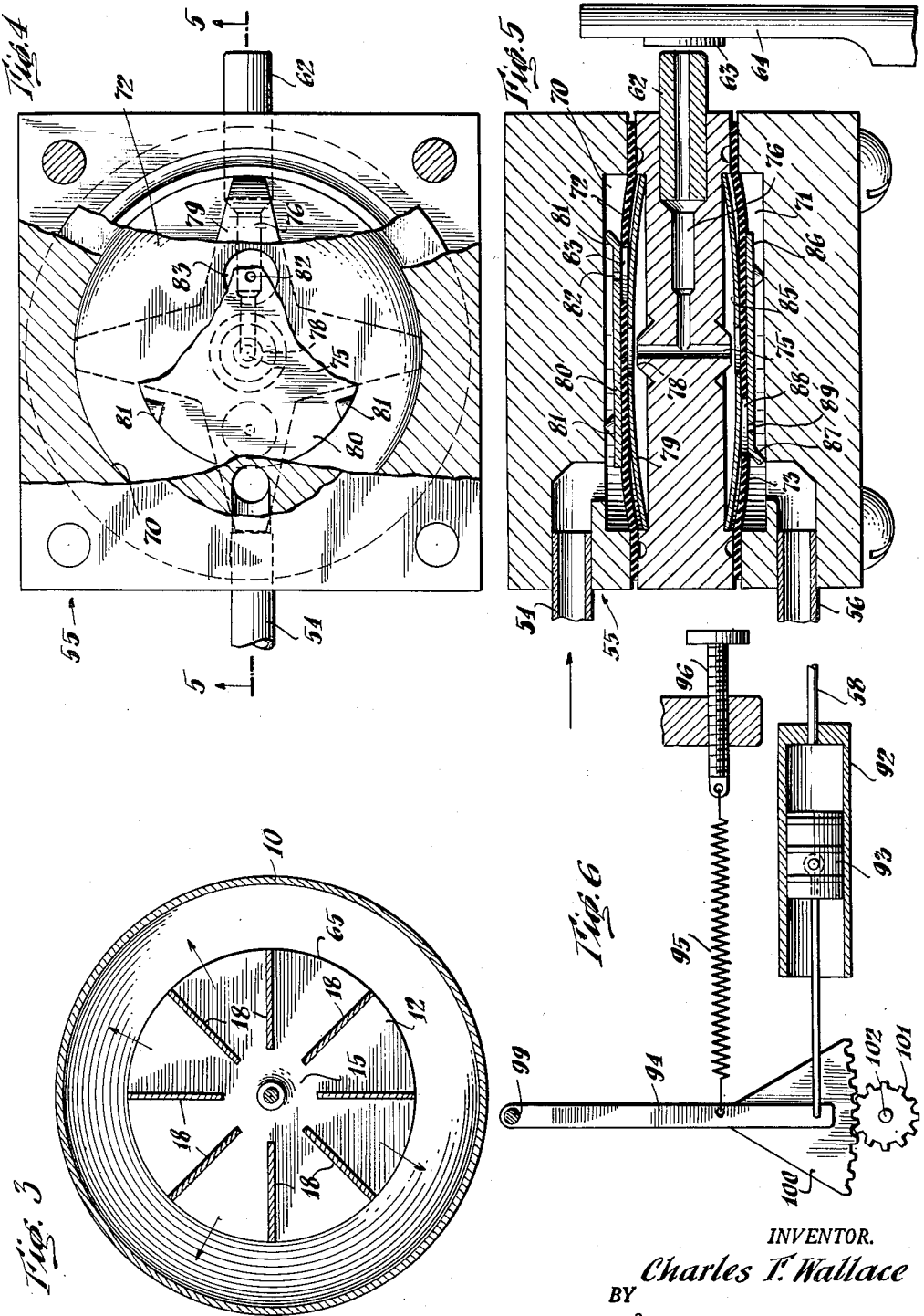

United States Patent Office 2,771,773
Patented Nov. 27, 1956

2,771,773

MEASUREMENT OF MASS RATE OF FLOW OF FLUENT MATERIAL

Charles F. Wallace, Westfield, N. J., assignor to Wallace & Tiernan Incorporated, a corporation of Delaware Application May 10, 1952, Serial No. 287,137

6 Claims. (Cl. 73—194)

This invention relates to apparatus and procedure for measuring fluent material, i. e. for detecting the rate of flow of such material as it is delivered continuously to and through the apparatus. By fluent material is meant divided solids, liquids, and semi-liquid or like substances having free-flowing characteristics, but all as distinguished from gases or vapors. Examples of such material, which the apparatus of the invention is specially adapted to measure, are grain, flour, meal, dry chemicals, other finely divided solids of powdered, granular or like character, and various liquids, all being substances which are adapted to be propelled in a readily fluid stream along channels or ducts. By rate of flow of the material is meant the amount of it (measured by weight) which passes a given place or point in a unit of time, such rate of flow being determinable, for example, as pounds, grams or other units of weight per hour, minute or the like. It will further be understood that unless otherwise specified, reference herein to measurement of rate of flow is intended to mean detection and utilization of the value of such rate or of the amounts of changes in it, whether the measurement is utilized for direct indication, as on a dial or recording device, or only for some other translated purpose such as in regulating or controlling the delivery of the material.

In a more specific sense, the invention is chiefly concerned with measurement of the flow of material which is or can be continuously advanced in an unconfined state, e. g. of such nature or so handled that it may flow through a region where it is exposed to space above it, whether the region itself is entirely closed or in part open to the atmosphere. For instance, even in the case of a liquid delivered from a pipe which is filled by the liquid flowing under pressure, the preferred embodiments of the present apparatus may nevertheless be employed providing the pressure requirements for over-all transmission of the flow are not such as to prevent passage of the liquid through a region (of the apparatus) without filling such region, it being feasible, if necessary for such purpose, to enclose the material-handling regions of the apparatus under super-atmospheric pressure. Thus as indicated above, and considered generally, the invention is applicable to flow measurement of many different kinds of fluent materials and under a variety of conditions.

A chief object of the invention is to afford improved and more efficient apparatus of the character described, and especially to provide such apparatus which will be of a rugged yet highly sensitive nature and which will achieve accurate flow detection over a wide range of rates. Indeed a further, specific object is to provide flow-measuring apparatus which is effectively responsive to an extremely wide variation in the rate of flow of the material under measurement, one relatively simple embodiment of the invention being accurately sensitive, for example, to flow rates differing by a hundred times or more.

Another object of the invention is to afford improved flow-measuring apparatus which is adapted to respond to many different kinds of fluent material and which is readily adapted for inclusion in various types of flow conduits, pipes, spouts, channels, or other lines through which the material may be moving. A still further object is to provide apparatus of the character described, embodying novel means for response to changes of flow of a passing material, and to provide such apparatus whereby direct, and preferably linear reading of the rate of flow may be continuously achieved, the instrument being further characterized by unusual simplicity, ruggedness and convenience of construction, while affording high accuracy and unusual promptness of response in use.

To these and other ends, the invention, as practiced in a presently preferred manner, embraces directing the stream of particles (or liquid) continuously to and through a defined region where a continuously rotating, constant-speed device propels the material in a radially outward direction to a peripheral delivery zone; mechanical energy is thus continuously expended on the flowing material to give it a constant angular velocity at such zone, or specifically (since the distance of advance is uniform) a constant tangential velocity. The energy so used for centrifugal propulsion of the material from a central locality to the edge of the rotating device, is conveniently transmitted from a constant-speed driving means, and therefore inherently varies with change in load as occasioned by variation in the amount of material which at any instant is undergoing advance by the centrifugal device. Indeed in the preferred operation as described, the energy required at any given time for accelerating the fluent substance to a constant velocity of discharge is directly proportional to the passing quantity of the substance, and in consequence the power thus transmitted, or changes in it, can be measured as a direct and accurate determination of the rate of flow. While other modes of translating the energy changes may be used, a further and presently preferred feature of the flow-detecting process involves converting variations in the transmitted power or torque into variations of a characteristic of a responsive medium, such as the pressure of air or other gas, and then detecting such characteristic, to yield an immediate, accurate, continuous reading of flow.

In a particularly effective apparatus embodying the invention, where the centrifugal accelerating means is driven by a suitable constant-speed source such as a synchronous motor, governor-controlled device or the like, the drive is effected through mechanical means which include a movable member that is variably biased or displaced in accordance with change in the amount of transmitted energy. This load-responsive member (which may be of special and unusually effective structure, as described below) is connected to control appropriate translating instrumentalities, which may advantageously include means applying a balancing force to the member under its own control. Such balancing force is supplied, for example, by a suitably responsive medium, which is thus varied in condition or character by the load-responsive member and which, as explained above, is caused to operate a measuring device (preferably continuously) for the desired actual detection of the rate of flow of material through the apparatus.

More particularly, the balancing means may include a cylinder and piston, or other expansible chamber, for variably opposing the control member, and may also include a device controlled by the member for adjusting fluid pressure in the chamber to the desired state of balance. In this embodiment of the invention, a pressure measuring instrument is connected with the chamber so as to provide a corresponding, continuous response which is representative of the rate of flow of the material.

It will now be appreciated that in the described apparatus, all particles or portions of the fluent material which traverse the rotating device are accelerated to a constant velocity at the delivery zone, e. g. the linear velocity of the outer rim of the device. The energy required for such acceleration is given by the usual formula $E=\frac{1}{2}MV^2$. Therefore by passing the material through the centrifugal device rotated at a suitable, preferably high speed, a relatively high velocity of the discharged particles or portions is achieved, and since the energy or load is proportional to the square of such velocity V, even a very small increment of mass M will represent a relatively large increment of energy. In consequence, a high accuracy of measurement, even for very small changes of rate of flow, is attainable by detecting, in effect, the changes in energy required to maintain the stated constant velocity.

By way of example, a particularly effective embodiment of the apparatus is described below and shown in the accompanying drawings, wherein:

Fig. 1 is an elevational view, with some parts shown partly in central vertical section, of the novel rate of flow meter;

Fig. 2 is a vertical section essentially on line 2—2 of Fig. 1, but with some parts in side elevation;

Fig. 3 is a horizontal section on line 3—3 of Fig. 1;

Fig. 4 is an enlarged detail view, partly in elevation and partly broken away in section on various planes, of a valve device embodied in Figs. 1 and 2;

Fig. 5 is a section on line 5—5 of Fig. 4; and

Fig. 6 is an enlarged, somewhat diagrammatic view of the actuating parts of a pressure-responsive measuring device included in Figs. 1 and 2.

Referring first to Figs. 1, 2 and 3, the apparatus includes a receiving vessel or hopper 10 circular in plan and adapted to enclose, at least laterally, a horizontal wheel 12 which is carried on a vertical shaft 13 and which has a central opening at its top for introduction of fluent material supplied through an inlet duct or channel such as the inclined tube 14. The material thus flows into the open center portion 15 of the wheel 12, which is constituted by vertically spaced disks or plates 16, 17, that are separated by a number of radial vanes 18. The wheel being rapidly rotated at a constant rate (by means described below), the received material is advanced outwardly between the vanes 18 by centrifugal force, and is then guided downwardly by the curved outer walls of the vessel 10 and its conical lower portion 19, to fall into a discharge tube or spout 20. To avoid impeding the outward propulsion of the material (in the wheel) as it is received at the central portion 15, the lower plate 18 may have an upwardly tapering central projection 22, e. g. in the nature of fairing around the shaft 13, as shown in Fig. 1, such structure 22 being concavely curved in vertical section to permit the desired change of direction of flow with a minimum of friction, turbulence and scattering. As illustrated, the lower end of the supply tube 14 projects slightly into the central opening of the upper wheel plate 16, with suitable small clearance, and in the structure shown, the drive shaft 13 traverses the upper wall of the tube 14, likewise with clearance as needed for free running of the shaft. Although completely enclosed arrangements can be employed in some cases, the upper end of the vessel 10 is here shown as open above the wheel 12, for simplicity of structure and operation.

Wheel 12 runs only partly full of material. Furthermore, as illustrated in the drawing, clearance is provided between the central portion of the wheel 12 and the lower end of the supply tube 14, and also between the outer periphery of wheel 12 and the vessel 10. As pointed out above, this apparatus may be used to measure the flow of granular materials such as divided solids. It is essential, where the apparatus is used with such materials, that these clearances be provided, in order that none of the solid particles will become caught between the stationary and moving parts and thereby frictionally load the wheel.

The divided solids with which this apparatus may be used are sometimes spoken of herein as granular materials. This expression is used herein as a generic term, and no limitation as to the size or shape of the material particles is intended by its use.

Among various means which might be used for driving the wheel 12 and likewise for detecting changes in power required to maintain constant speed of the wheel, an unusually effective structure includes a suitable constant-speed power source such as a synchronous electric motor 24, and a gear train consisting, for instance, of a pinion 25 on the motor output shaft 26, meshing with a large gear 27 which in turn meshes with another pinion 28 (conveniently identical with the pinion 25) on the shaft 13. As shown, these parts are carried on a supporting frame generally designated 30 and including spaced upper and lower plates 32, 33, the motor 24 being mounted on the upper plate 32. The wheel shaft 13 is journaled in suitable ball bearings 34, 35 in the respective plates, and also carries a collar or flange 36, for instance above the bearing 35, to hold the shaft vertically and thus to suspend the wheel 12 in proper position within the vessel 10, it being understood that appropriate supporting structure (not shown) is provided for the vessel. The inlet pipe 14, for example as shown, may be carried directly by a suitably shaped portion 38 of the frame 30.

The large intermediate gear 27 (turning, like the other gears, on a vertical axis) is rotatably mounted at an upper portion of a vertical lever or column 40, that is in turn pivotally mounted at its lower end to swing on an axis 41 perpendicular to the axis of the wheel 27 and conveniently intersecting the axes of the pinions 25, 28, the axes of the latter being parallel and at diametrically opposite sides of the gear 27. The pivotal support of the lever 40 on the axis 41 is provided in suitable fashion, as by means of lateral pivot pins 42, 42, seated in bearings 43, 43, carried by the base plate 33.

At a convenient intermediate point 44 on the upright lever 40, at least substantially spaced from its pivot axis 41, there is pivoted one end of the connecting rod 45 of a piston 46 which is adapted to slide in a cylinder 47 carried by an upright element 48 of the rigid frame 30. Advantageously, a suitable bias may be maintained on the vertical beam or lever 40, as by a coil spring 50 under tension, extending from a point on the lever spaced from its pivot axis 41, to a retaining screw 51 threaded in an upright member 52, adjustment of the bias being thus effected by adjusting the screw 51 to vary the tension of the spring. As further stated below, any increase of resistance to turning in the shaft 13 reacts on the gears 27, 25 and tends to cause the lever 40, which carries the gear 27, to rock to the left, i. e. counterclockwise as shown in Fig. 2, and thus against the spring 50 and against the force of air or other fluid supplied to the cylinder 47.

To provide an appropriately regulated supply of fluid under pressure to the cylinder, a tube 54 which may receive the fluid from a suitable source (not shown) and which thus very preferably receives a continuous flow of air under pressure, extends to a flow control valve generally designated 55 and then via a tube 56 to the cylinder 47, the tube 56 having a branch tube or line 58 to a pressure gauge or indicator generally designated 60. The system for supply of fluid, e. g. air or other gas, to the cylinder via the line 56 also includes an exhaust tube or outlet 62, which is adapted to be closed or partly closed by a valve disk 63 mounted on an upright member 64 which is rigidly carried by and thus movable with the lever 40, the valve element 63 being of rubber or other suitable resilient material and having a face which cooperates with the open end of the exhaust tube 62 so that the relation of these parts may vary smoothly between a completely closed condition and an effectively widely open condition with relatively very little total, rocking displacement of the member 64 and its supporting lever 40.

Assuming that the motor 24, through the described gear train, is driving the wheel 12 at a selected, constant rate of speed and that fluent material such as grain, flower, other cereal product or other dry, divided solid, is introduced in an essentially continuous stream to the inlet tube or chute 14, the operation of the apparatus will now be readily apparent. As stated, and further assuming that the motor 24 is turning the pinion 25 and likewise the pinion 28 and wheel 12 each in a counter-clockwise direction as viewed from above, any resistance to rotation of the shaft 13 will tend to displace the large gear 27 and its axis, relative to the pinions 25, 28, i. e. in such way that the gear and its lever 40 will tend to rock to the left as seen in Fig. 2. The force thus exerted on the lever to rock it about the axis 41 is exactly proportional to the turning resistance in the shaft 13. As also indicated hereinabove, the function of the wheel 12 is to accelerate all of the particles or portions of material entering it from the tube 14, to an ultimate velocity equal to the velocity of the outer rim or edge 65 of the wheel, such peripheral speed of the wheel being advantageously kept constant, under the drive of the synchronous motor 24 or other speed-regulated device. The energy so required to propel the particles radially of the wheel by centrifugal force, is provided by the torque applied to the wheel through the shaft 13 and will necessarily vary with the mass of the material traversing the wheel at any given instant, such energy being directly proportional to the product of the mass by the square of the constant peripheral velocity to which the particles are accelerated.

As will now be seen, the total force exerted on the lever 40, tending to rock it about the axis 41, is in effect the sum of two components, viz. (1) the load passing through the wheel 12, and (2) the mechanical friction in all the moving parts except the motor. The second of these components may be conveniently balanced out by the spring 50, suitable adjustment of the spring tension being effected preliminarily during a no-load condition, i. e. when no material is traversing the wheel. The air supply system through lines 54 and 56 is so arranged as to exert a force on the piston 46 which exactly balances the remaining force tending to rock the lever, and thus in the preferred arrangement shown, which exactly balances the other component, i. e. the load passing through the wheel 12. Regulation of the pressure in the cylinder 47 and thus of the balancing force exerted by the piston 46 is effectuated by the bleed-off valve 62—63, the member 63 being automatically closed toward the exhaust tube 62 just sufficiently at all times to provide enough pressure in the cylinder 47 to hold the lever 40 in balance.

For example, if there is an increase in the rate of flow of material supplied by the tube 14 to the wheel 12, this increase of load will tend to rock the lever 40 to the left (Fig. 2), closing the member 63 further toward the outlet 62 so that less of the pressure of the incoming air (through tube 54) is relieved by exhaust and a higher pressure is built up in the cylinder 47, i. e. until the parts are exactly re-balanced. Likewise if there is a decrease in the amount of material flowing through the apparatus, the reduction of load on the wheel permits the lever 40 to rock very slightly in the opposite direction (i. e. to the right in Fig. 2) opening the exhaust port 62 somewhat further so that the pressure in the cylinder 47 is reduced and the tendency of the piston to move the lever 40 clockwise is interrupted, i. e. in a new position of balance.

Since the restoring or balancing force exerted in the cylinder 47 is proportional to the pressure of the contained fluid, i. e. air, the pointer 67 of the pressure indicator (which reads the pressure in the line 56) will afford a continuous indication of the instantaneous load in the wheel 12 and consequently, of the rate of flow of the fluent material through the wheel. In other words, the rate of flow is continuously measured, i. e. by the pressure in the line 58, and may be directly indicated (or otherwise utilized) in any convenient manner, as by the gauge 60; indeed, if desired, the dial of the pressure indicator can be directly calibrated in pounds per minute or other suitable flow units for the material which is under measurement. With or without supplemental dashpot means (not shown) extending to the lever 40 to take up transient fluctuations, the balancing spring 50 is of importance in attainment of highly accurate results and particularly in affording a wide range of flow rates; it automatically compensates for all opposing forces of a constant character, including friction in the gears and bearings, windage friction in the wheel 12, and the like, so that the response of the piston 46 is essentially restricted to the actual load of the fluent material.

While various types of valve devices, gauges and other pressure-sensitive instrumentalities may be usefully employed in the system, certain especially convenient structures are shown in the drawings by way of example. Thus the flow control valve 55 is more particularly illustrated in Figs. 4 and 5 as including housing or body structure shaped to provide two spaced, parallel cavities 70, 71, each of shallow cylindrical configuration and each divided by a corresponding, flexible diaphragm, such as the respective diaphragms 72, 73. The inner sections of the chambers 70, 71, are connected by a relatively narrow passage 75, from which a branch passage 76 extends to the exhaust tube 62. The tube 75 thus connects the chambers at the inner sides of their respective diaphragms while the outer sides of the chambers are connected respectively to the air supply tube 54 and the controlled-pressure tube 56. The diaphragm 72 is biased outwardly away from closure against a seating surface 78 around the passage 75, by spring means such as the resilient metal spider 79, the diaphragm being kept from engagement with the outer wall of the cavity by a plate 80 carrying a plurality of spacing lugs or projections 81.

Thus continuous, though somewhat restricted, communication is maintained from the inlet tube 54 (which opens into the outer portion of the cavity 70) through apertures 82 and 83 respectively in the plate 80 and the diaphragm 72, to the interior portion of the chamber 70. That is to say, with the spring 79 normally keeping the diaphragm away from the valve seat 78, air may flow through the described openings from the inlet 54 to the passage 75. Similar structure is conveniently also provided, in reverse arrangement, in the chamber 71, i. e. a spring spider 85 urging the diaphragm outwardly, with a plate 86 and its spacing lugs 87 to keep the diaphragm from seating against the outer face of the cavity. Normal communication is thus maintained between the passage 75 and the controlled-pressure line 56, via the inner portion of the chamber 71, and openings 88, 89, in the diaphragm 73 and plate 86 respectively.

It will now be appreciated that the described valve arrangement provides smooth and effectively reliable response of the apparatus, and thus of the gauge or other indicating means connected to the line 58, such response being unaffected by surges and other transient effects and yet sufficiently prompt to afford an essentially continuous and immediate indication by the pointer 67. For example, if a sudden surge occurs in the air supply through the line 54, the diaphragm 72 closes momentarily against the port 78, i. e. against the spring 79, so as to avoid an undue pressure rise in the controlled line 56 before the member 64 can adjust itself. Indeed it will be noted that the supply of air to the inlet 54 need, at most, be no more than reasonably or approximately constant in pressure, i. e. in that the member 64 and thus the valve element 63, 62 will automatically compensate (by appropriate opening or closing of the valve) for changes in pressure of the supplied air, as well as afford the desired re-balancing response to changes of load in the wheel 12.

As has now been explained, the pressure of air in the line 56, and thus the balancing force applied to the piston 46, are regulated by the valve device 62—63, which automatically relieves the excess pressure of the supplied air to the extent exactly necessary for the desired proportional response. While any of a variety of pressure-sensitive translating devices can be connected with the line 56 for indication, recording or control in accordance with the rate of flow of material through the apparatus, Figs. 1, 2 and particularly Fig. 6, illustrate essential features of one particularly suitable type of indicator 60. The air pressure to be measured is communicated through the tube 58 to a cylinder 92 that has its piston 93 linked to a lever 94 upon which the force of the piston is opposed by a spring 95, the tension of the spring being suitably adjustable, for calibration of the instrument, by the retaining screw 96. By appropriate mechanical means (which may, if desired, include suitable anti-backlash means of known character, not shown) the lever 94 is arranged to adjust the pointer 67 which may sweep over a suitable scale 98. For example, the lever 94 may carry, at the end opposite its pivot 99, a gear sector 100 which meshes with a pinion 101 on the shaft 102 of the pointer 67. Smooth, rapid operation of the described gauge is facilitated by permitting a very slight but continuous leakage of air around the piston 93 (as indeed also around the piston 46), such leakage serving in effect for lubrication; since the leakage is constant, as well as extremely small, it has no effect on the accuracy and proportionality of response.

The described pressure indicating device 60 affords a continuous and essentially instantaneous measurement of pressure in the line 56, the position of the pointer 67 being determined by the position of the piston 93, which is brought to rest, after any change of pressure, by the correspondingly greater or less balancing force of the spring 95.

The complete apparatus shown has been found to afford an unusually accurate response to the rate of flow of material supplied to the inlet tube 14 and discharged through the outlet 20. For example, in one embodiment of the apparatus utilizing a wheel 12 which is 12 inches in diameter and has 16 radial fins 18 (it being understood that more fins, or fewer as shown, can be used, depending somewhat on the size of the wheel), a metering range of from zero to 30 pounds per minute has been easily achieved, e. g. for flour, grain and similar dry materials. The wheel was driven at a constant speed of 450 R. P. M. (although other speeds, say within a range of 100 to 3600 R. P. M. are eminently suitable) and a highly accurate and reliably reproducible control of the air pressure in line 56 was obtained over a very large variation of rates of flow, e. g. a variation of considerably more than 100 times in the particular device mentioned. As indicated above, the pressure of air supplied to the air inlet 54 is not essentially critical; for instance, where air was furnished at an approximate pressure of 30–35 pounds per square inch, this particular apparatus, functioning over the stated range of flow rates afforded a corresponding range of pressures in the lines 56, 58 of 0 to 15 pounds per square inch.

The apparatus is easily calibrated (indeed for direct marking of the scale 98 in units of flow), for example by preliminary test or operation with material supplied at not more than a few different, known rates of flow in succession. Although materials of considerably differing characteristics may require individual calibrations of the device, it will be understood that such can all be preliminarily obtained, and if desired, established on replaceable scales for the indicator 60, as by scales respectively to be used for measurement of flour, wheat grain, and other specific kinds of substances. While other fluid media can be employed for the controlled, force-responsive balance action on the lever 40 (including air under sub-atmospheric or vacuum conditions, then arranged to push rather than pull the lever; or alternatively, liquid under pressure, preferably with a bellows instead of a piston, and with an enclosed discharge for the valve), the illustrated system utilizing air under pressure is particularly simple and effective and permits an essentially rugged type of construction.

It will be appreciated that the supply of material to the upper central opening of the wheel 12 is very appreciably such that as received in the space 15, the material has a constant head. Such result is most conveniently achieved, in many cases, by reducing the head of the material to nearly zero as it reaches the wheel; for instance, where the material enters after sliding down an inclined conduit such as shown at 14, it has little or no kinetic energy at the time of reaching the wheel, and essentially zero momentum in any direction in a horizontal plane. It will also be appreciated that either with divided solids or with liquids, the upper limit of the range of flow rates to be measured should ordinarily be less than of sufficient magnitude to fill the wheel 18 (or the inner portions of the regions between its vanes) completely. That is to say, it is assumed that the material will be enabled to flow freely outward in the wheel under the centrifugal action and without opportunity for development of appreciable back pressure or the like. Manifestly, the described condition is easily satisfied in any case by provision of a wheel 12 of abundant size to accommodate the largest expected flow, in an unimpeded manner.

It is to be understood that the invention is not limited to the specific embodiments herein shown and described but may be carried out in other ways without departure from its spirit.

I claim:

1. Apparatus for measuring the rate of flow of a fluent material, comprising a casing, an impeller within said casing, an inlet conduit conveying fluent material to the central portion of said impeller, said impeller having at least one radial passage extending between said central portion and the impeller periphery, an outlet conduit conveying fluent material away from the periphery of the impeller, said casing, said impeller passage, and said inlet and outlet conduits defining a path for said fluent material through said apparatus, means driving said impeller at a substantially constant speed to accelerate all the passing fluent material through a predetermined substantially constant increment of velocity as it passes from the central portion of the impeller to the periphery, said driving means comprising a motor outside said path, a mechanical driving connection from the motor through the path defining means to the impeller, and a reaction member outside said path and subject to a reaction force applied through said driving connection and varying with the load on said impeller, a stationary member movably supporting said reaction member, means to apply to said reaction member a force opposing the reaction force, and means responsive to the position of the reaction member with respect to said stationary member to control said force applying means to balance the opposing forces, and means for measuring the force of said force applying means including means calibrated to translate the force measurement into a rate of flow measurement, said stationary member, said force applying means and said force measuring means all being located outside said path.

2. Apparatus as defined in claim 1 for measuring the rate of flow of a fluent material, wherein said means to apply an opposing force to the reaction member comprises an expansible chamber having a movable wall operatively connected to said member, and said means to control said force applying means comprises means for supplying fluid under pressure to said chamber, a stationary outlet member for the fluid in said chamber, and a valve member mounted on said reaction member and cooperating with said outlet member to control the pressure in said chamber to balance said reaction force, said valve member being effective upon a relatively small travel to vary said pressure throughout its range, and said measuring means includes means for indicating the pressure in said chamber, so that movement of the indicating means throughout its range may occur substantially without change in the angular position of the impeller with respect to the driving means.

3. Apparatus for measuring the rate of flow of a fluent material, comprising a casing, an impeller within said casing, a conduit conveying fluent material to the central portion of said impeller, said impeller having at least one radial passage extending between said central portion and the impeller periphery, a discharge conduit conveying fluent material away from the periphery of the impeller, said casing, said impeller passage, and said inlet and outlet conduits defining a path for said fluent material through said apparatus; means driving said impeller at a substantially constant speed to accelerate all the passing fluent material through a predetermined substantially constant increment of velocity as it passes from the central portion of the impeller to the periphery, said driving means comprising a motor outside said path, a support for said motor, and a mechanical connection from the motor through the path defining means to the impeller; and torque responsive means mechanically connected to the driving means and including a reaction member located outside said path and mounted on and movable with respect to said support in response to a reaction force applied through said mechanical connection, and means responsive to movement of said reaction member for measuring and indicating the force acting on said movable member and tending to move it with respect to said support, and hence indicating the force required to accelerate said material, said last named means being calibrated to translate said last-mentioned force indication into a rate of flow indication.

4. Apparatus as defined in claim 3 for measuring the rate of flow of a fluent material, in which said mechanical connection includes a rotatable element and means connecting said rotatable element to the impeller for concurrent rotation therewith, said rotatable element being rotatably supported on said reaction member.

5. Apparatus for measuring the rate of flow of a fluent material, comprising a casing, an impeller within said casing, an inlet conduit conveying fluent material to the central portion of said impeller, said impeller having at least one radial passage extending between said central portion and the impeller periphery, a discharge conduit conveying fluent material away from the periphery of the impeller, said casing, said impeller passage, and said inlet and outlet conduits defining a path for said fluent material through said apparatus; means driving said impeller at a substantially constant speed to accelerate the fluent material from the central portion of the impeller to the periphery, said driving means comprising a motor outside said path, a support for said motor, and a mechanical connection from the motor through the path defining means to the impeller; and torque responsive means mechanically connected to the driving means and including a reaction member located outside said path and mounted on and movable with respect to said support in response to a reaction force applied through said mechanical connection, a spring acting on said reaction member in a direction to oppose said reaction force, said spring being effective to balance the reaction force acting on the reaction member when no fluent material is being accelerated, and means responsive to movement of said reaction member for measuring and indicating the force acting on said movable member and tending to move it with respect to said support, and hence indicating the force required to accelerate said material.

6. Apparatus as defined in claim 5 for measuring the rate of flow of fluent material including means for adjusting the tension of the spring to calibrate said measuring means.

References Cited in the file of this patent

UNITED STATES PATENTS

| | | |
|---|---|---|
| 413,684 | Sargent | Oct. 29, 1889 |
| 597,567 | Robinson | Jan. 18, 1898 |
| 2,172,095 | White | Sept. 15, 1939 |
| 2,223,712 | Ziebolz | Dec. 3, 1940 |
| 2,493,012 | Moore et al. | Jan. 3, 1950 |
| 2,591,478 | Turner | Apr. 1, 1952 |
| 2,602,330 | Kollsman | July 8, 1952 |
| 2,624,198 | Pearson | Jan. 6, 1953 |